(12) United States Patent
Ichikawa

(10) Patent No.: US 6,226,199 B1
(45) Date of Patent: May 1, 2001

(54) NON-VOLATILE SEMICONDUCTOR MEMORY

(75) Inventor: Takaaki Ichikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/538,525

(22) Filed: Mar. 30, 2000

(30) Foreign Application Priority Data

Sep. 17, 1999 (JP) .................................................. 11-264429

(51) Int. Cl.$^7$ .................................................. G11C 16/04
(52) U.S. Cl. ......................................................... 365/185.04
(58) Field of Search .......................................... 365/185.04

(56) References Cited

U.S. PATENT DOCUMENTS 5,640,347 * 6/1997 Lin et al. ......................... 365/185.04
5,881,002 * 3/1999 Hamakawa ....................... 365/185.04

* cited by examiner

*Primary Examiner*—Trong Phan
(74) *Attorney, Agent, or Firm*—Arent Fox Kintner Plotkin & Kahn, PLLC

(57) ABSTRACT

A non-volatile semiconductor memory includes a certification data storage portion storing certification data, a password storage portion storing a password, a decision circuit deciding whether a password included in an address signal is identical to the password stored in the password storage portion, and an output control portion controlling readout of the certification data from the certification data storage portion according to a decision by the decision circuit.

10 Claims, 5 Drawing Sheets

NON-VOLATILE SEMICONDUCTOR MEMORY

BACKGROUND OF THE INVENTION

1. Field of the Invention

The present invention relates to semiconductor memories and in particular to non-volatile semiconductor memories having a security function.

2. Description of the Related Art

A conventional non-volatile semiconductor memory with a security function has an OTP (One Time Program or Protect) region where a pass-word, an ID number and the like are stored, and programmed data cannot be rewritten semi-permanently. Therefore an illegal rewrite, for example whereby the data programmed previously in OTP region are rewritten with information from other devices by an illegal user, is prevented.

However, on the access to this region, only the rewrite is impossible and the readout operation is possible for all users. Accordingly, since the data settled in the region can be read out by an illegal user, there is a serious problem in respect to the security.

Therefore, it seems to be most effective to forbid the readout of the data in the above OTP region by unauthorized users, thus preventing the above illegal copying. However, a method using a password is generally proposed as a way to forbid the readout of the data. In this method, it is decided in the device whether the password is correct or not when a user inputs a password before he accesses the desired data. Then the access is forbidden if it is decided that the password is not correct. On the other hand, the access is permitted if it is decided that the password is correct.

However, a problem in the above method using a password is that the password is broken easily. Namely if a password with 8 bits is used for example, there are only 256 possible combinations that can be used as the password. In such a case, an illegal user can break the password easily by trying to input all the combinations in turn.

Hence, if we try to use a more complicated password having more bits, it is required that a semiconductor memory has an extremely large circuit size. As seen above, when the conventional security method is applied to semiconductor memories, a trade-off between complexity of the password and the circuit size is necessary.

SUMMARY OF THE INVENTION

It is a general object of the present invention to provide a novel and useful non-volatile semiconductor memory wherein the foregoing problems are eliminated.

A more specific object of the present invention is to provide a non-volatile semiconductor memory having a more effective security function.

The above objects of the present invention are achieved by a non-volatile semiconductor memory including a certification data storage portion storing certification data, a password storage portion storing a password, a decision circuit deciding whether a password included in an address signal is identical to the password stored in the password storage portion, and an output control portion controlling readout of the certification data from said certification data storage portion according a decision by said decision circuit.

According to the present invention, the non-volatile semiconductor memory can achieve an improved security function without increasing the circuit scale.

Other objects and further features of the present invention will become apparent from the following detailed description when read in conjunction with the attached drawings.

DESCRIPTION OF THE PREFERRED EMBODIMENTS

Figure 1:
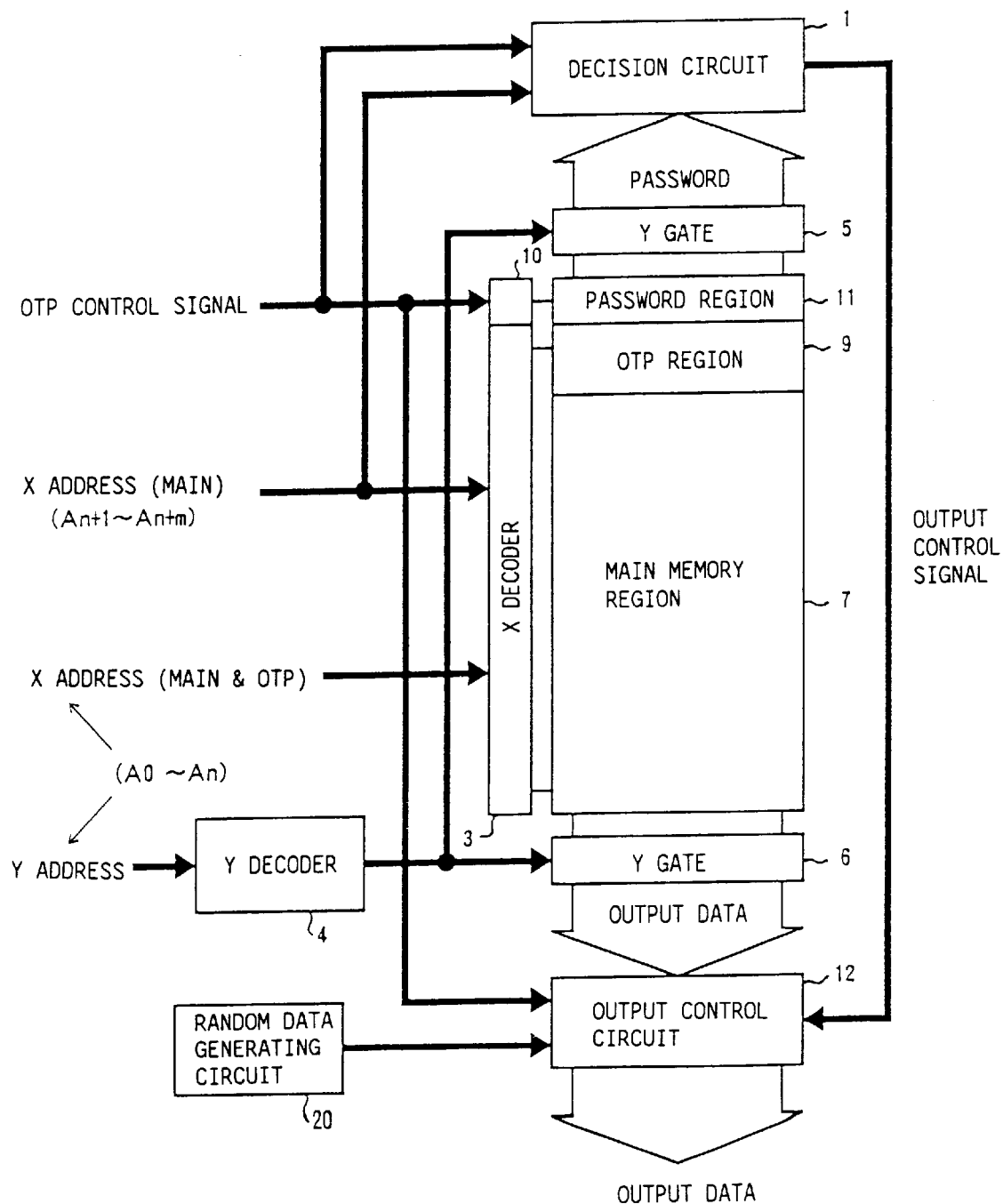
FIG. 1 is a diagram showing a configuration of the non-volatile semiconductor memory according to an embodiment of the present invention.

Hereinafter, a non-volatile semiconductor memory with a normal operation mode and an OTP mode as a certification mode according to an embodiment of the present invention will be described with reference to the drawings. It should be noted that identical marks in the drawings indicate an identical or equivalent part.

FIG. 1 is a diagram showing a configuration of the non-volatile semiconductor memory according to an embodiment of the present invention. As shown in FIG. 1, the non-volatile semiconductor memory includes a decision circuit 1, an X decoder 3, a decoder 10, a Y decoder 4, Y gates 5,6, a main memory region 7, an OTP region 9, a password region 11, an output control circuit 12 and a random data generating circuit 20.

An X address A0~An+m and a Y address are input to the X decoder 3 and the Y decoder 4 respectively. An OTP control signal is input to the decoder 10. The Y gates 5,6 are connected to the Y decoder 4, and the main memory region 7 is connected to the X decoder 3 and the Y gate 6. Furthermore, the OTP region 9, being connected to the X decoder 3 and joined to the main memory region 7, stores OTP data such as a password and an ID number. The password region 11, being connected to the decoder 10 and joined to the Y gate 5, stores a password. The output control circuit 12, being connected to the decision circuit 1 and joined to the Y gate 6, is supplied with an OTP control signal. The random data generating circuit 20 generates random data and supplies the random data to the output control circuit 12.

It should be noted that a rewrite on the stored OTP data is forbidden in the OTP region 9.

An outline of the operation of the above non-volatile semiconductor memory shown in FIG. 1 will be described below with reference to the timing charts of FIGS. 2A–2D.

Figure 2:
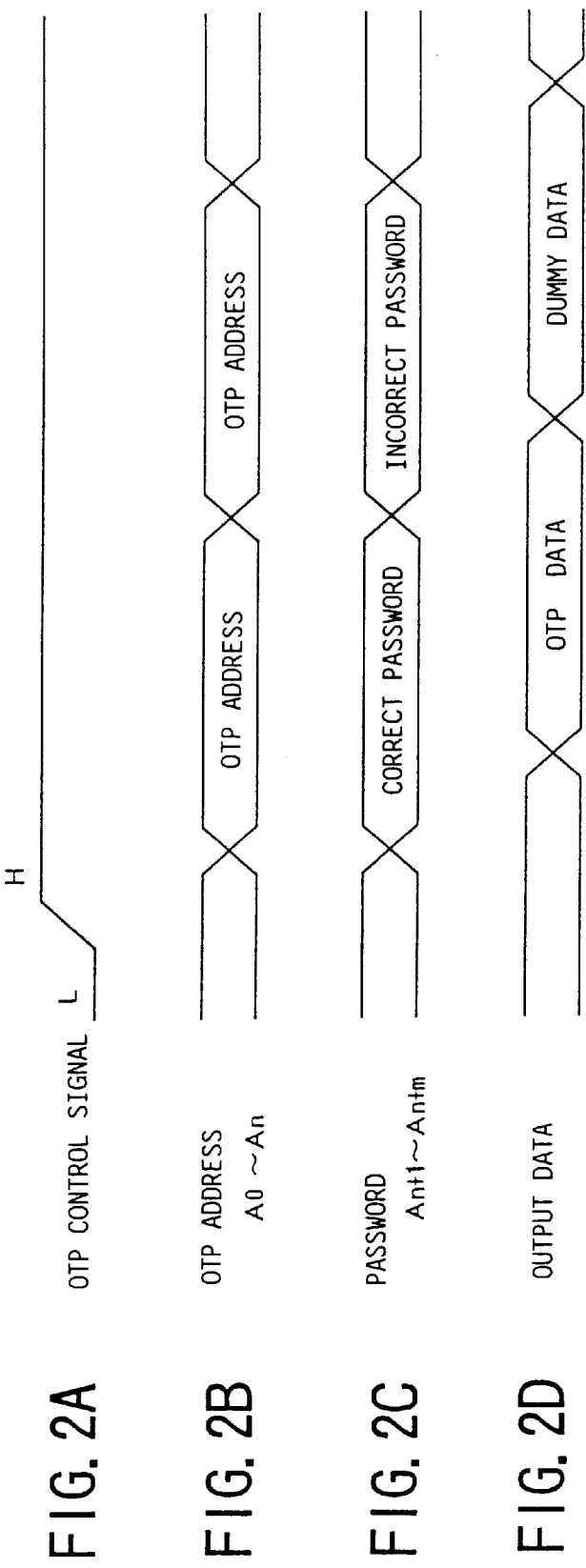
FIGS. 2A–2D are timing charts for an explanation of the operation in OTP mode.

As seen in FIG. 2A, the device operates in the normal operation mode when the OTP control signal is set to the low (L) level. In the normal operation mode, the device can read out and write in the desired data to the memory cell (not shown in drawings) in the main memory region 7 according to a X address A0~An+m and a Y address.

Next, as shown in FIG. 2A, when the OTP control signal is set to the high (H) level by a supplied external command and the like, the non-volatile semiconductor memory enters the OTP mode. In the OTP mode, it is certified that the password input by a user is identical to the previously stored password. At this time, as seen in FIGS. 2B and 2C, an OTP address with an X address A0~An and an Y address, and a password with an X address An+1~An+m are input simultaneously.

Hereupon, as shown in FIG. 1, the X address A0~An and the Y address are supplied to the X decoder 3 and the Y decoder 4 respectively. In addition, a password with a X address An+1~An+m is supplied to the decision circuit 1.

It should be noted that the X address An+1~An+m is used for appointing a memory block in the main memory region 7 and row address in the normal operation mode, however, the X address An+1~An+m is not used in an access to the OTP region 9 since the storage capacity of the OTP region 9 is extremely small compared to that of the main memory region 7. Hence, in the non-volatile semiconductor memory according to this embodiment, the X address An+1~An+m, which is not used in an access to the OTP region 9, is used for inputting a password from the outside.

The X address A0~An and the Y address are used as a row address and a column address respectively for addressing a memory cell in the main memory region 7 in the normal operation mode, and used for addressing a memory cell in the OTP region 9 in the OTP mode. In addition, the above Y address is also used as a column address for addressing the data to read out from the password region 11 in the OTP mode.

The decision circuit 1 compares an X address An+1~An+m input as a password from the outside with a password read out from the Y gate 5, and supplies a high-level output control signal to the output control circuit 12 when it is decided that the password input from the outside is correct. At this time, as shown in FIG. 2D, the output control circuit 12 outputs an OTP data read out from the OTP region 9.

On the other hand, a low-level output control signal is supplied to the output control circuit 12 by the decision circuit 1 when an incorrect password is input from the outside. Then, as seen in FIG. 2D, the output control circuit 12 outputs random data, being generated by the random data generating circuit 20, as dummy data.

Figure 3:
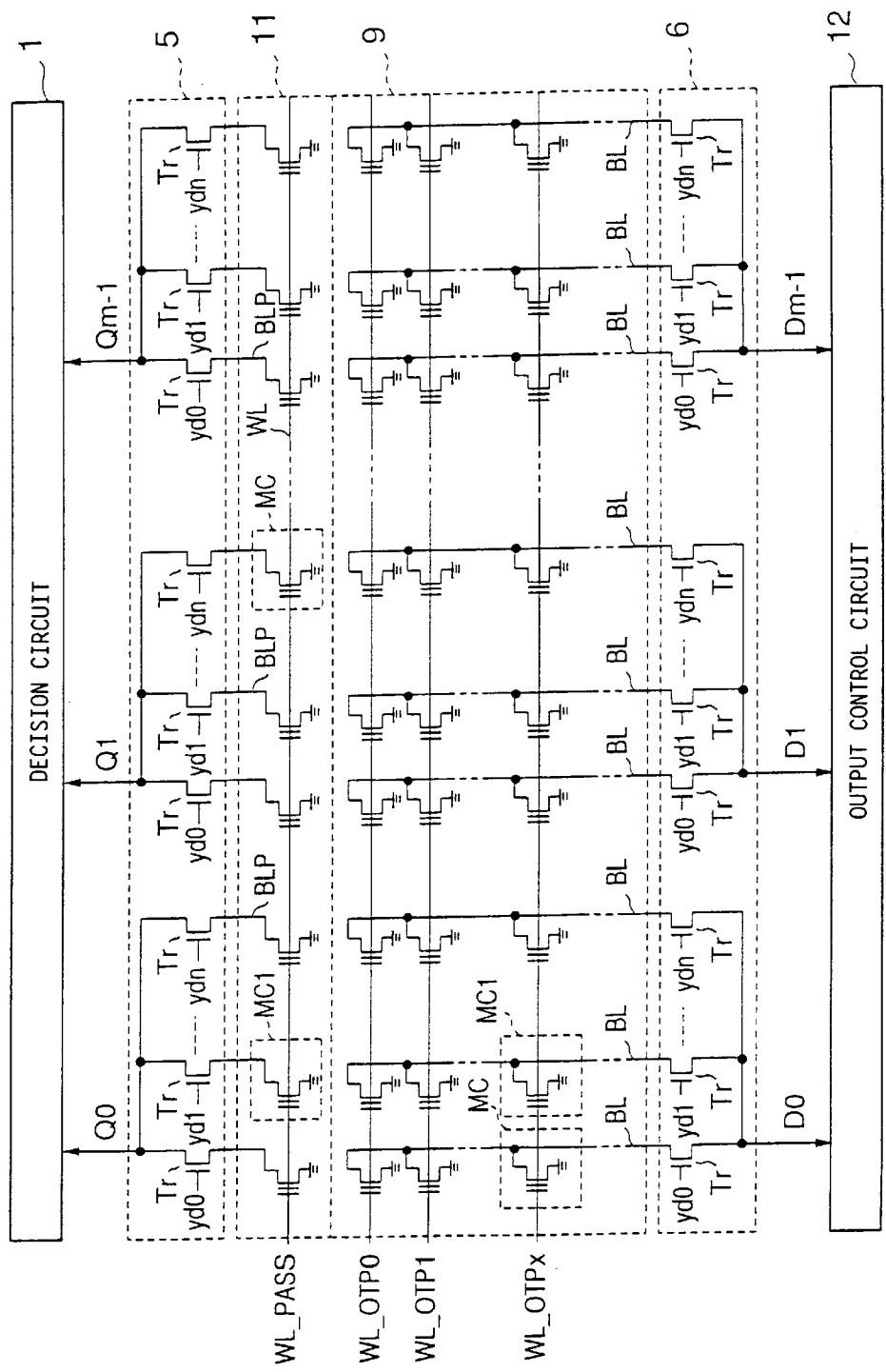
FIG. 3 is a diagram showing circuit configurations of Y gates, a password region and an OTP region in the non-volatile semiconductor memory shown in FIG. 1.

FIG. 3 is a diagram showing circuit configurations of the Y gates 5,6, the password region 11 and the OTP region 9 in the non-volatile semiconductor memory shown in FIG. 1. It should be noted that the main memory region 7 is omitted in FIG. 3 for convenience.

As shown in FIG. 3, each Y gate 5,6 includes m sets of n+1 transistors Tr that are arranged in a row, on the gates of which a column address (Y address) yd0~ydn with n+1 bits is supplied. Namely, the column address is shared when data are read out and written in on the password region 11 and the OTP region 9.

Further, since the device has the above configuration, a password Q0~Qm−1 with m bits is output from the Y gate 5 to the decision circuit 1, and a data D0~Dm−1 with m bits is output from the Y gate 6 to the output control circuit 12.

The password region 11 has a memory cell array with the same configuration as that of the OTP region 9. To be more precise, the password region 11 includes non-volatile memory cells MC which are connected respectively between a transistor Tr in the Y gate 5 and a ground node, and the gates of which are connected to the wordline WL_PASS. Then each bit line BLP included in the password region 11 is connected to the decision circuit via the Y gate 5.

The OTP region 9 includes non-volatile memory cells MC which are connected respectively between a transistor Tr in the Y gate 6 and a ground node, and the gates of which are connected respectively to any one of the wordlines WL_$_{OTP}$0~OTPx. Then each bit line BLP included in the password region 11 is connected to the decision circuit via the Y decoder 5. Then, as shown in FIG. 3, each bit line BL, where the non-volatile memory cells MC are connected, is connected to the output control circuit 12 via the Y gate 6.

Figure 4:
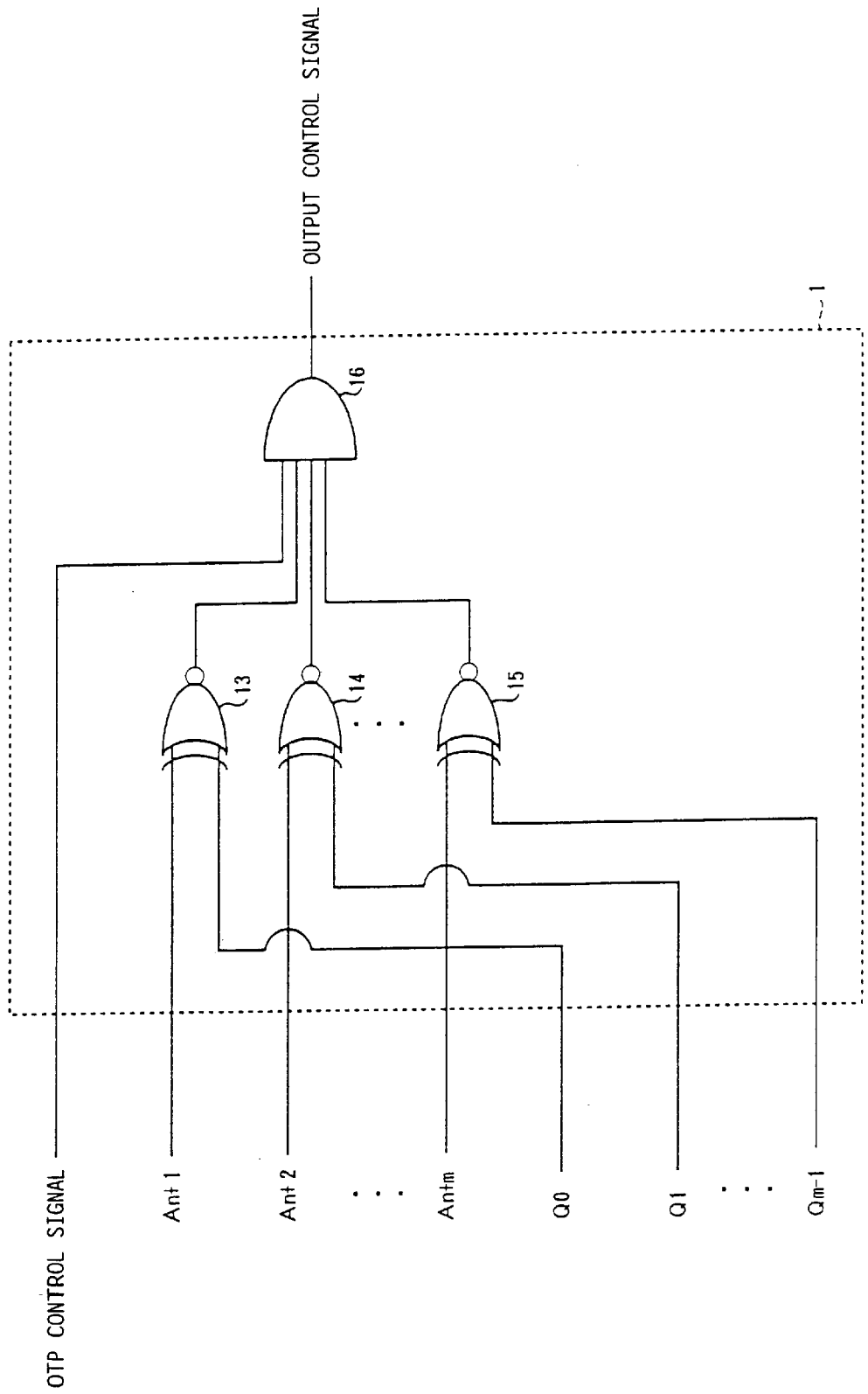
FIG. 4 is a diagram showing a configuration of the decision circuit shown in FIG. 1.

FIG. 4 is a diagram showing a configuration of the decision circuit 1 shown in FIG. 1. As shown in FIG. 4, the decision circuit 1 includes exclusive NOR circuits 13~15 and an AND circuit 16. Each exclusive NOR circuit 13~15 is supplied with a signal having a predetermined bit of the X address An+1~An+m and a signal having a predetermined bit of the password Q0~Qm−1 output from the Y gate 5. The AND circuit 16 is supplied with signals output from the exclusive NOR circuits 13~15 and the OTP control signal, and outputs the output control signal.

Figure 5:
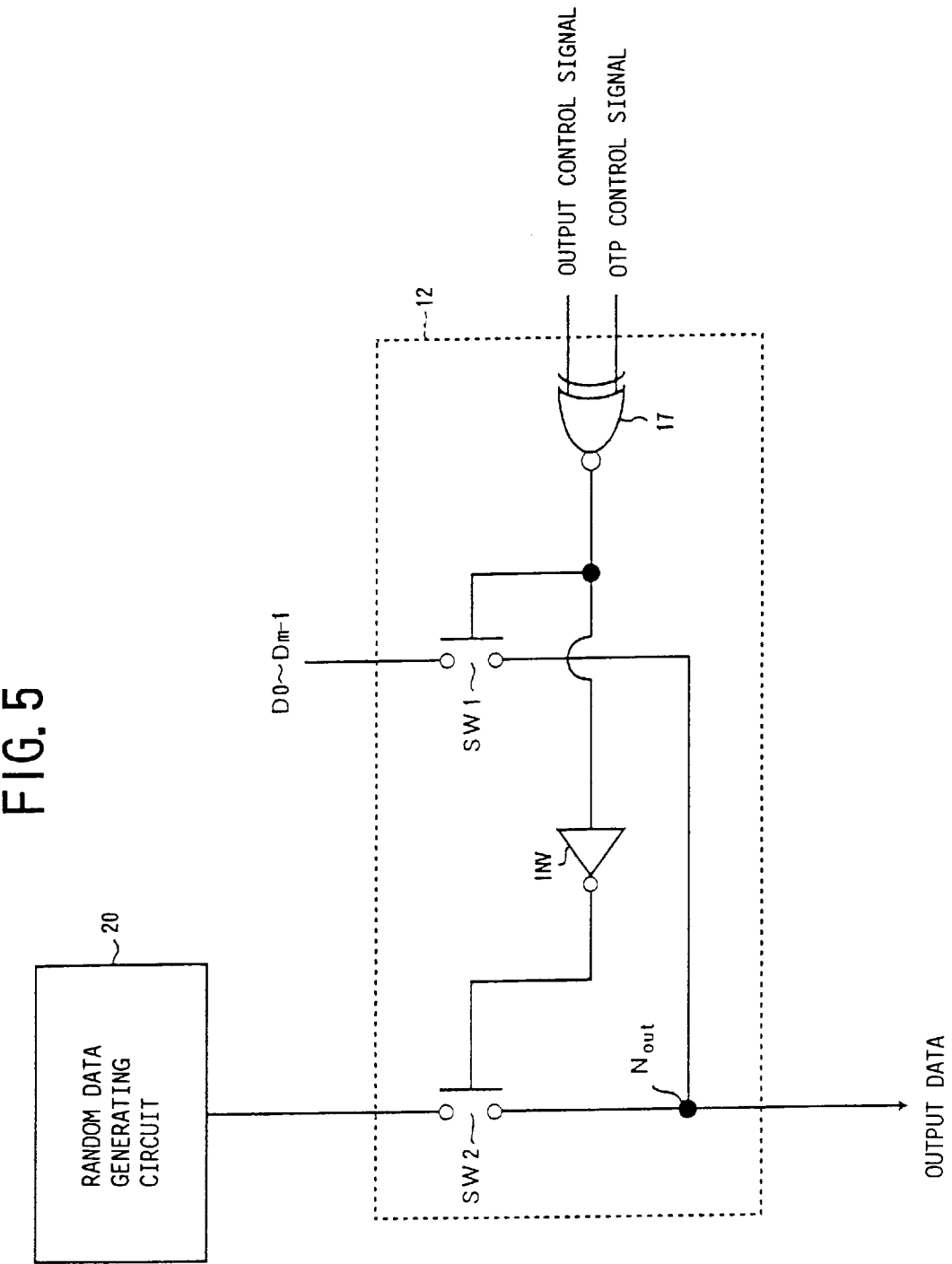
FIG. 5 is a diagram showing a configuration of the output control circuit shown in FIG. 1.

FIG. 5 is a diagram showing a configuration of the output control circuit 12 shown in FIG. 1. As shown in FIG. 5, the output control circuit 12 includes an exclusive NOR circuit 17, an output node Nout, switching elements SW1, SW2, and an inverter INV. The exclusive NOR circuit 17 is supplied with the output control signal from the decision circuit 1 and the OTP control signal. The switching element SW1 is connected between the output node Nout and the Y gate 6, and is controlled according to the signal from the exclusive NOR circuit 17. The inverter INV inverts a signal supplied from the exclusive NOR circuit 17. The switching element SW2 is connected between the random data generating circuit 20 and the output node Nout, and is controlled according to the signal from the inverter INV. It should be noted that both of the above switching elements SW1, SW2 are made "on" by being supplied with a high-level signal, and made "off" by being supplied with a low-level signal.

Hereinafter, the operation of the above non-volatile semiconductor memory according to the embodiment of the present invention will be described in detail.

In the normal operation mode, as described above, the device can read out and write in the desired data to the memory cell (not shown in drawings) in the main memory region 7 according to a X address A0~An+m and a Y address.

Then, since the OTP control signal is set to the low level in the normal operation mode, the output control signal output from the AND circuit 16 shown in FIG. 4 is also set to the low level. Therefore, the switching element SW1 has the on-state all the time since the output signal of the exclusive NOR circuit 17 shown in FIG. 5 is set to the high (H) level in the normal operation mode. Then, data D0~Dm−1 selected in the Y gate 6 is output from the output node Nout. It should be noted that the switching element SW2 has the off state constantly at this time.

Next, the decision circuit 1 has an enable state in the OTP mode where the OTP control signal is set from the low level to the high level because the OTP control signal is supplied to the AND circuit 16 as seen in FIG. 4. At this time, the wordline WL_PASS included in the password region 11 is boosted to the level whereby the readout of data is possible. After the device enters this mode, the OTP address with a X address A0~An and a Y address, and a password with a X address An+1~An+m are input simultaneously to the device. Then, the X address A0~An and the Y address are supplied to the X decoder 3 and the Y decoder 4 respectively. In addition, the password with the X address An+1~An+m is supplied to the decision circuit 1.

In the above, the memory cells MC1 which are arranged in the same column of the password region 11 are also selected simultaneously when the memory cells MC1 in the OTP region 9 are selected according to a high-level signal yd1 as seen in FIG. 3 for example. The reason is that the above Y address is also used as the column address for selecting data to read out from the password region 11 in the OTP mode. In this way, a data D0~Dm−1 with m bits is output as the OTP data from the OTP region 9 to the output control circuit 12, and a password Q0~Qm−1 with m bits is read out from the password region 11 to the decision circuit 1.

It should be noted that many passwords can be stored without enhancement of the chip area since non-volatile memory cells MC included in the password region 11 store a password corresponding to each column address supplied from the outside.

Then, the decision circuit 1 shown in FIG. 4 compares a X address An+1~An+m, being input as a password from the outside, with a password Q0~Qm−1 having m bits read out from the password region 11.

To be more precise, the exclusive NOR circuit 13~15 decides whether the password Q0~Qm−1 is identical to every corresponding bit with the X address An+1~An+m. Thus, a high-level output control signal is supplied to the output control circuit 12 by the AND circuit 16 only when the exclusive NOR circuit 13~15 decides that the password Q0~Qm−1 is identical on all corresponding bits with the X address An+1~An+m.

The output control circuit 12 outputs data D0~Dm−1 read out from the OTP region 9 as seen in FIG. 2D since the switching element SW1 switches "on" according to a high-level output signal of the exclusive NOR circuit 17 shown in FIG. 5 when the output control circuit 12 is supplied with the high-level output control signal by the decision circuit 1.

On the other hand, the exclusive NOR circuit 17 is supplied with a low-level output control signal by the decision circuit 1 when an incorrect password is input from the outside. Then, the switching element SW1 switches "off" and the switching element SW2 switches "on" since an output signal of the exclusive NOR circuit 17 shown in FIG. 5 is set to the low level. Therefore, as seen in FIG. 2D, the output control circuit 12 outputs a random data generated by the random data generating circuit 20 as dummy data, being different from the proper data D0~Dm−1 read out from the OTP region 9.

On the above, another configuration can be proposed for preventing an unauthorized access to the system having the above non-volatile semiconductor memory.

Namely, the non-volatile semiconductor memory stores first and second passwords for protection against the unauthorized access in the password region 11 and in the OTP region 9 respectively. In such a system, as the first stage, a user needs to input a password that is identical to the password stored in the password region 11 of the device. Then the second password, being stored in the OTP region 9, is output from the non-volatile semiconductor memory to the interior of the system when the password input by the user is identical to the password stored in the password region 11.

Furthermore, the user needs to input a password that is identical to the above second password to the system so that the access to the above system can be permitted.

Therefore, according to the above configuration, double passwords can be used in the system including the non-volatile semiconductor memory.

As described above, according to the non-volatile semiconductor memory as an embodiment of the present invention, the security function is improved without enhancement of the circuit scale by utilizing a part of an address signal, being unused in the OTP mode, for the input of a password. Furthermore, an illegal user can not recognize whether the output data is proper or not because dummy data is output when the password input from the outside is incorrect. Thus, since the non-volatile semiconductor memory according to the embodiment of the present invention can make it more difficult for the user to determine whether the password input by the user is correct or not, the device can improve the security function in this way too.

The present invention is not limited to the specifically disclosed embodiment, and variations and modifications may be made without departing from the scope of the present invention.

The present application is based on Japanese priority application No. 11-264429 filed on Sep. 17, 1999, the entire contents of which are hereby incorporated by reference.

What is claimed is:

1. A non-volatile semiconductor memory comprising:

a certification data storage portion storing certification data;

a password storage portion storing a password;

a decision circuit deciding whether a password included in an address signal is identical to the password stored in said password storage portion; and an output control portion controlling readout of the certification data from said certification data storage portion according to a decision by said decision circuit.

2. The non-volatile semiconductor memory as claimed in claim 1, wherein:

said output control portion outputs the certification data read out according to an address, being included in said address signal, on said certification data storage portion in case that said decision circuit decides that the password included in said address signal is identical to the password stored in said password storage portion.

3. The non-volatile semiconductor memory as claimed in claim 1, wherein:

said password storage portion shares a column address with said certification data storage portion.

4. The non-volatile semiconductor memory as claimed in claim 1, further comprising a main memory region, wherein:

said certification data storage portion includes a memory cell array joined to said main memory region.

5. The non-volatile semiconductor memory as claimed in claim 1, wherein:

said password storage portion stores a plurality of passwords corresponding respectively to column addresses supplied to said certification data storage portion.

6. The non-volatile semiconductor memory as claimed in claim 1, wherein:

the password included in said address signal is formed in a part of said address signal, the part being unused for accessing said certification data storage portion.

7. The non-volatile semiconductor memory as claimed in claim 1, wherein:

at the least said password storage portion and said certification data storage portion have an identical memory cell array structure;

a bit line included in said password storage portion is connected to said decision circuit; and a bit line included in said certification data storage portion is connected to said output control portion.

8. The non-volatile semiconductor memory as claimed in claim 1, wherein:
said certification data storage portion stores a second password for protection of a system including said non-volatile semiconductor memory.

9. The non-volatile semiconductor memory as claimed in claim 1, wherein:
said output control portion outputs dummy data in case that said decision circuit decides that the password included in said address signal is not identical to the password stored in said password storage portion.

10. The non-volatile semiconductor memory as claimed in claim 9, further comprising a dummy data generating circuit for generating random data supplied as said dummy data to said output control portion.

* * * * *